United States Patent
Becvar et al.

(10) Patent No.: US 10,849,139 B2
(45) Date of Patent: Nov. 24, 2020

(54) HIERARCHICAL RESOURCE SCHEDULING METHOD OF WIRELESS COMMUNICATION SYSTEM

(71) Applicants: HON HAI PRECISION INDUSTRY CO., LTD., New Taipei (TW); Czech Technical University in Prague, Prague (CZ)

(72) Inventors: Zdenek Becvar, Prague (CZ); Pavel Mach, Zdar nad Sazavou (CZ); Morten Høgdal, Soborg (DK); Andrijana Popovska Avramova, Lyngby (DK)

(73) Assignees: HON HAI PRECISION INDUSTRY CO., LTD., New Taipei (TW); Czech Technical University in Prague, Prague (CZ)

( * ) Notice: Subject to any disclaimer, the term of this patent is extended or adjusted under 35 U.S.C. 154(b) by 0 days.

(21) Appl. No.: 16/806,067

(22) Filed: Mar. 2, 2020

(65) Prior Publication Data

US 2020/0205168 A1    Jun. 25, 2020

Related U.S. Application Data

(63) Continuation of application No. 15/892,776, filed on Feb. 9, 2018, now Pat. No. 10,624,105.

(60) Provisional application No. 62/609,476, filed on Dec. 22, 2017, provisional application No. 62/457,252, filed on Feb. 10, 2017.

(51) Int. Cl.
*H04W 72/12* (2009.01)
*H04W 72/04* (2009.01)
*H04L 1/12* (2006.01)
*H04L 1/18* (2006.01)
*H04W 88/08* (2009.01)

(52) U.S. Cl.
CPC ............... *H04W 72/12* (2013.01); *H04L 1/12* (2013.01); *H04L 1/1887* (2013.01); *H04L 1/1896* (2013.01); *H04W 72/04* (2013.01); *H04W 72/048* (2013.01); *H04W 72/0486* (2013.01); *H04L 1/1822* (2013.01); *H04W 72/1226* (2013.01); *H04W 88/085* (2013.01)

(58) Field of Classification Search
None
See application file for complete search history.

(56) References Cited

U.S. PATENT DOCUMENTS

| 2010/0284346 | A1* | 11/2010 | Rudrapatna | H04W 72/1247 370/329 |
| 2014/0256331 | A1* | 9/2014 | Adachi | H04W 16/10 455/447 |
| 2015/0257155 | A1* | 9/2015 | Wijetunge | H04W 72/048 370/329 |

* cited by examiner

*Primary Examiner* — Jutai Kao
(74) *Attorney, Agent, or Firm* — ScienBiziP, P.C.

(57) ABSTRACT

A resource scheduling method of a wireless communication system is provided. The resource scheduling method includes the following steps. Each of the user equipment (UEs) is classified by a centralized scheduler as a cell-edge UE or a non cell-edge UE. A first scheduling is performed by the centralized scheduler by allocating a first resource for the cell-edge UEs, a second resource for the non cell-edge UEs, and a third resource for retransmission of at least one of the cell-edge UEs. A second scheduling is performed by a distributed scheduler by allocating a first part of the second resource for at least one of the non cell-edge UEs.

21 Claims, 7 Drawing Sheets

HIERARCHICAL RESOURCE SCHEDULING METHOD OF WIRELESS COMMUNICATION SYSTEM

CROSS-REFERENCE TO RELATED APPLICATIONS

The application is a continuation of and claims priority under 35 U.S.C. § 120 to U.S. application Ser. No. 15/892,776, filed Feb. 9, 2018, and entitled "HIERARCHICAL RESOURCE SCHEDULING METHOD OF WIRELESS COMMUNICATION SYSTEM", which claims the benefit of U.S. Provisional Application Ser. No. 62/457,252, filed on Feb. 10, 2017, and entitled "Hierarchical scheduling for C-RAN" and U.S. Provisional Application Ser. No. 62/609,476, filed on Dec. 22, 2017, and entitled "DYNAMIC SPLIT OF SCHEDULING FUNCTIONALITIES BETWEEN BBU AND RRH", which are incorporated herein by reference in its entirely.

FIELD

The present disclosure generally relates to hierarchical resource scheduling methods of wireless communication systems.

BACKGROUND

The medium access control (MAC) scheduling scheme for cloud radio access network (C-RAN) may utilize a scheduler in the baseband unit (BBU). The fronthaul latency may be the limiting factor to the performance. For example, there might be significant throughput losses due to fronthaul with limited capacity and/or non-zero latency (i.e., non-ideal fronthaul). Another approach utilizes a MAC scheduling split between the BBU and the RRH. The proposed MAC functional split includes a centralized unit (CU) located in BBU and distributed unites (DUs) in the RRHs so that the CU is in charge of scheduling and the DUs handles retransmissions by means of HARQ. However, the resource allocation for retransmission and impact of fronthaul are not considered.

BRIEF DESCRIPTION OF THE DRAWINGS

Implementations of the present technology will now be described, by way of example only, with reference to the attached figures, wherein.

DETAILED DESCRIPTION

Figure 1:
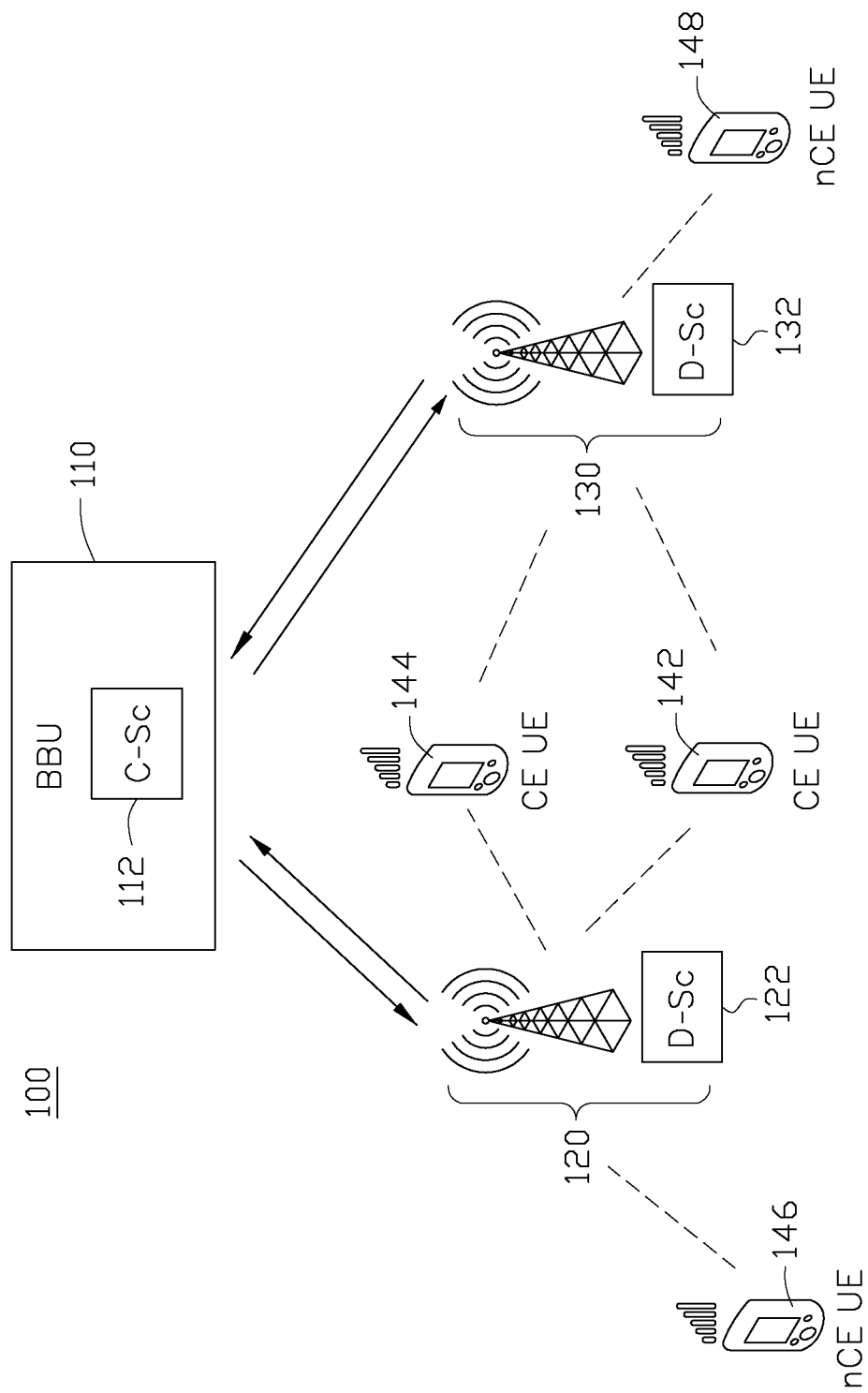
FIG. 1 is a schematic diagram illustrating a wireless communication system, according to an exemplary embodiment of the present disclosure.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

FIG. 1 is a schematic diagram illustrating a wireless communication system 100, according to an exemplary embodiment of the present disclosure. The wireless communication system 100 includes a baseband unit (BBU) 110, remote radio heads (RRHs) 120 and 130, and user equipment (UEs) 142, 144, 146 and 148. In this embodiment, the BBU 110 is configured to communicate with RRH 120 and RRH 130 through the fronthaul. The RRH 120 is configured to communicate with the UEs 142, 144, and 146. The RRH 130 is configured to communicate with the UEs 142, 144, and 148. In this embodiment, the UEs 142 and 144 are the cell-edge (CE) UEs, while the UEs 146 and 148 are the non cell-edge (nCE) UEs. The CE UEs (e.g., CE UE 142 and CE UE 144) suffer from interference imposed by neighboring cells in DL and UEs in adjacent cells in UL.

The BBU 110 includes a centralized scheduler (C-Sc) 112. The RRH 120 includes a distributed scheduler (D-Sc) 122. The RRH 130 includes a distributed scheduler (D-Sc) 132. The C-Sc 112 schedules data transmission for CU UEs (e.g., CE UEs 142 and 144). The C-Sc 112 may exploit knowledge on the interference from other cells (RRHs) or other UEs and schedule resources efficiently accordingly. The D-Scs 122 and 132 schedule data transmission for nCE UEs (e.g., nCE UEs 146 and 148), which are not influenced by interference from the other cells or other UEs. In one embodiment, the C-Sc 112 also schedules data transmission for nCU UEs (e.g., CE UEs 146 and 148).

Figure 2:
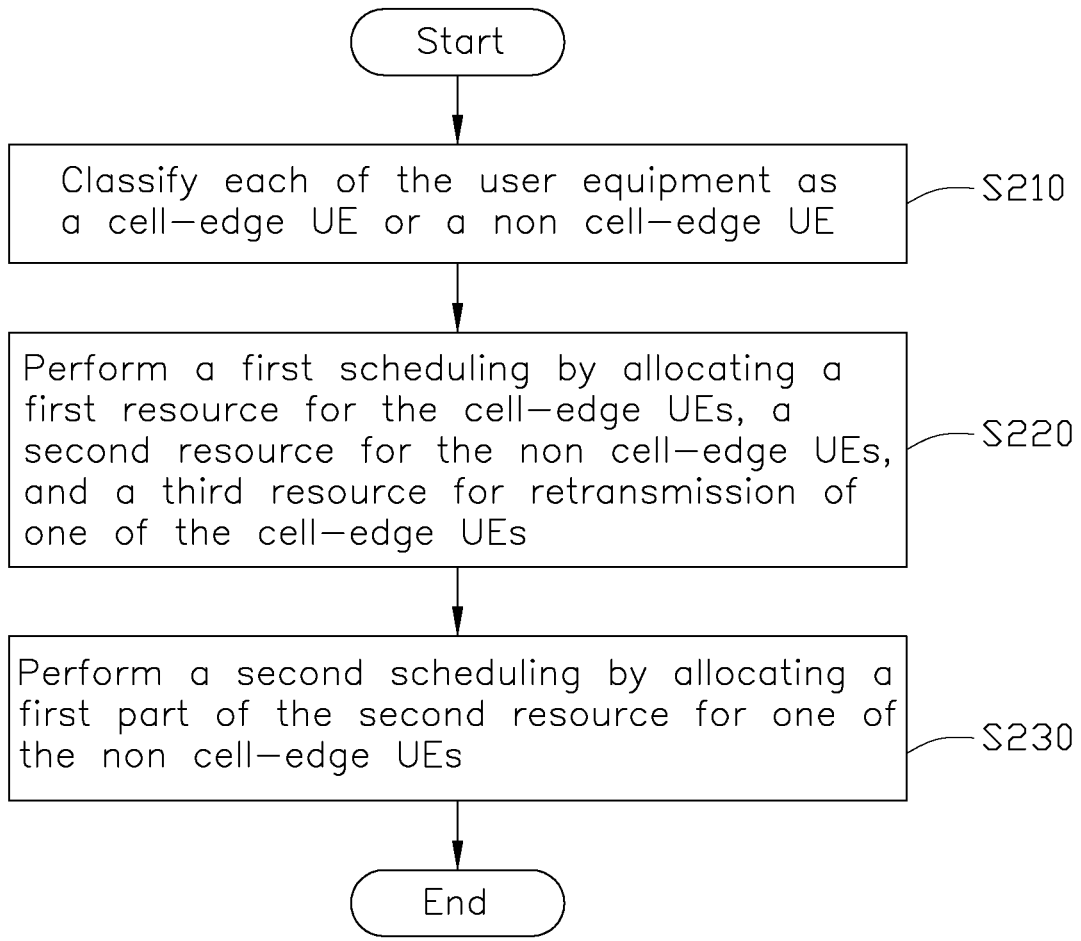
FIG. 2 is a flowchart of a resource scheduling method of a wireless communication system, according to an exemplary embodiment of the present disclosure.

FIG. 2 is a flowchart of a resource scheduling method of a wireless communication system, according to an exemplary embodiment of the present disclosure. In step S210, each of the UE is classified by the C-Sc as a CE UE or a nCE UE. In step S220, a first scheduling is performed by the C-Sc. In the first scheduling, a first resource is allocated for the CE UEs, a second resource is allocated for the nCE UEs, and a third resource is allocated for retransmission for one of the nCE UEs. In step 5230, a second scheduling is performed by the D-Sc. In the second scheduling, a first part of the second resource is allocated for at least one of the nCE UEs.

In one embodiment, each part of the first resource is allocated respectively for one of the CE UEs, and each part of the second resource is allocated respectively for one of the nCE UEs. In one embodiment, in the second scheduling, a second part of the second resource is allocated respectively for retransmission of at least one of the non cell-edge UEs.

Figure 3:
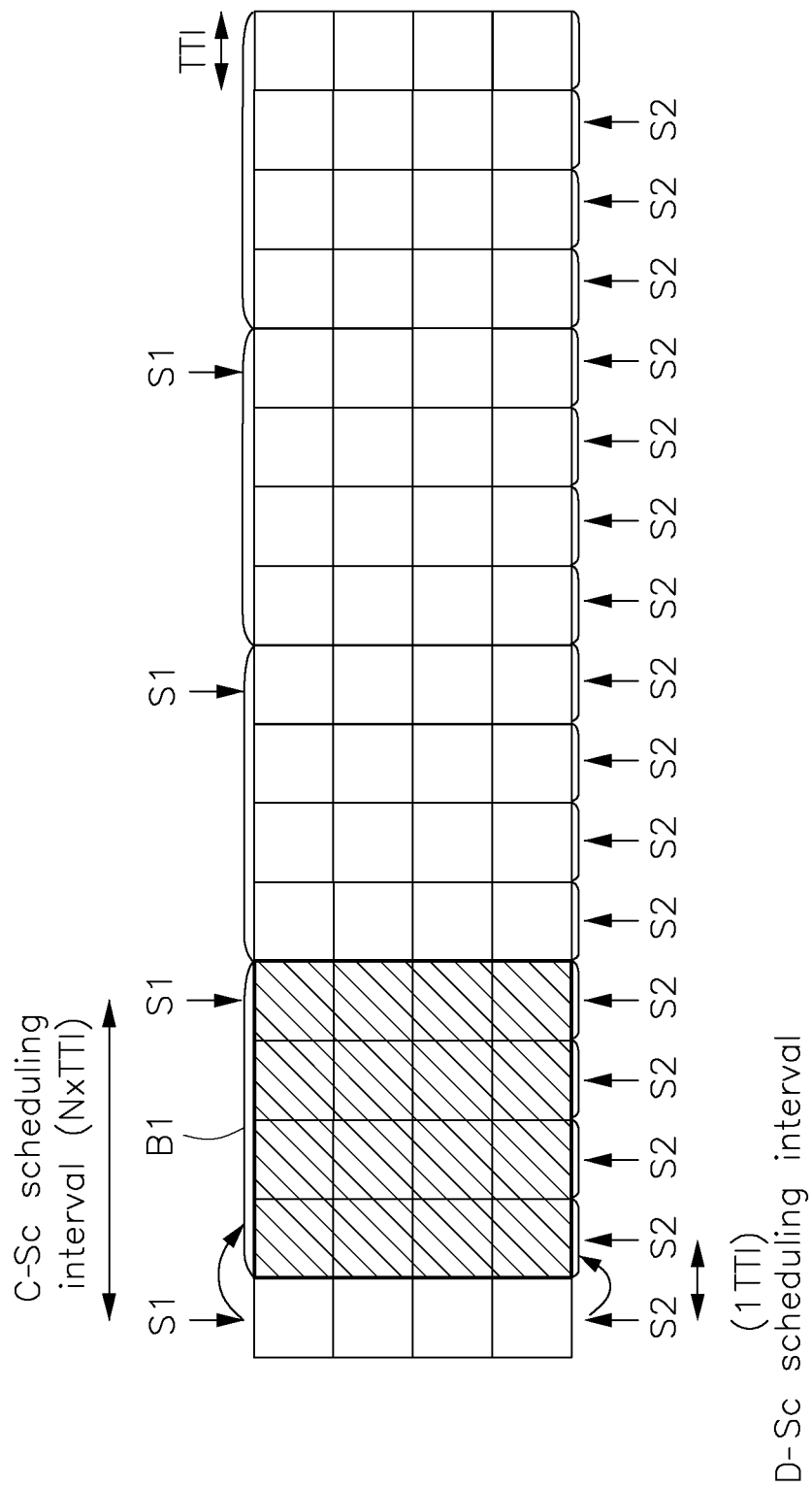
FIG. 3 is a schematic diagram illustrating a two level resource scheduling method, according to an exemplary implementation of the present application.

FIG. 3 is a schematic diagram illustrating a two level resource scheduling method, according to an exemplary implementation of the present application. In this embodiment, resource scheduling method is performed in two levels with different periodicity, and the scheduling period of the first scheduling performed by the C-Sc is greater than the scheduling period of the second scheduling performed by the D-Sc. As shown in FIG. 3, the C-Sc performs long-term scheduling S1 by allocating resource blocks (e.g., B1) for both CE UEs and nCE UEs, which is understood as a scheduling decision not only for one time transmission interval (TTI), but for N consecutive TTIs (NxTTI). The scheduling period may be adjusted dynamically over time.

On the other hands, after the long-term scheduling is performed by the C-Sc, the D-Sc performs the short-term scheduling S2 for the nCE UEs at every TTI (1xTTI). Thus, the D-Sc may further perform the short-term scheduling and the resource allocations (e.g., a part of resource blocks B1) may be adjusted so that the changes in channel quality may be reflected and therefore the performance may be improved for the nCE UEs. This way, the D-Sc can further tune the long-term scheduling decisions for the nCE UEs tentatively outlined by the C-Sc to improve performance exploiting up to date channel knowledge. As the nCE UEs do not suffer from the interference imposed by the neighboring RRHs, the scheduling decision for these UEs does not have to be coordinated with neighboring RRHs and it is up to individual D-Sc to change allocation according to its preference. In one embodiment, the D-Sc only adjusts the resources scheduled for the nCE UEs since any change for the CE UEs might lead to an increased interference to the CE UEs.

In one embodiment, the parameter N of the scheduling period may be adjusted according to a fronthaul status. The fronthaul status may include the RTT delay on the fronthaul. In one embodiment, the parameter N of the scheduling period may be adjusted according to a radio channel status. The radio channel status may include a dynamicity of the radio channel (influenced by UEs' mobility, channel variation over time, etc). A high value of N reduces complexity of the C-Sc and lowers signaling overhead between the RRHs and the BBU. On the other hand, if the value of N is too high, it may lead to a potential degradation of performance (e.g., throughput) as the scheduling does not reflect actual radio conditions (e.g., channel state information aging). In some embodiments, the parameter N of the scheduling period may be adjusted when both a fronthaul status and radio channel status are considered.

Figure 4:
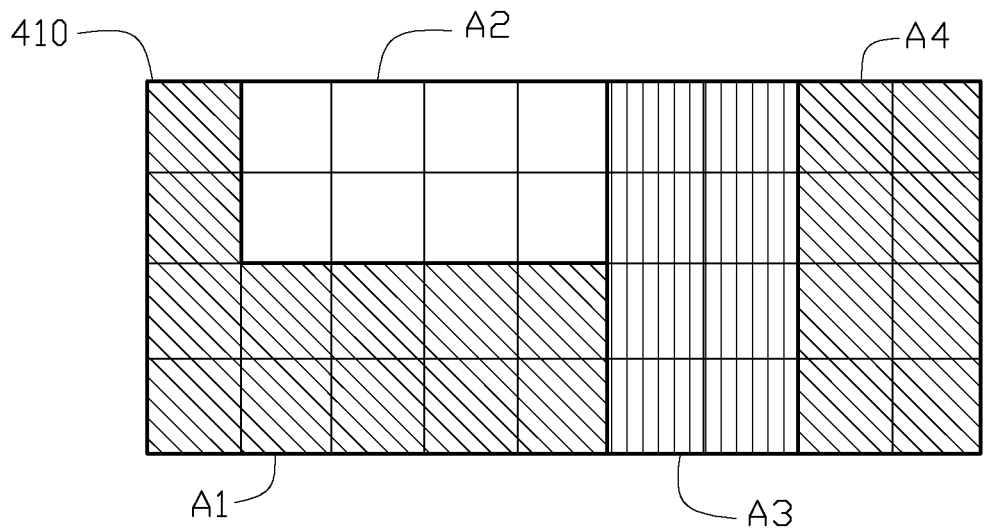
FIG. 4 is a schematic diagram illustrating resource allocation of two RRHs with coordinated scheduling coordinated multipoint (CoMP) employed, according to an exemplary implementation of the present application.
Figure 4:
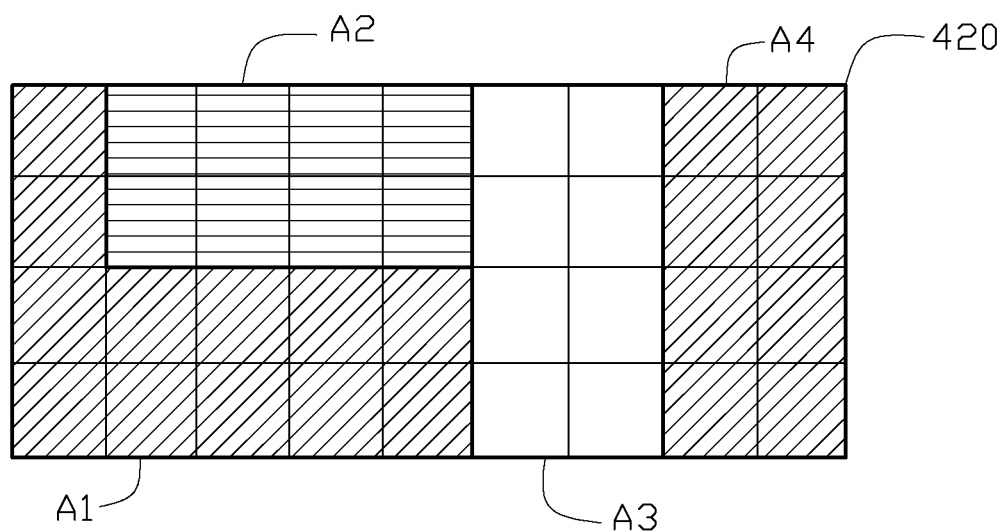

FIG. 4 is a schematic diagram illustrating resource allocation of two RRHs with coordinated scheduling CoMP employed, according to an exemplary implementation of the present application, where 410 is the resource allocation for one RRH, and 420 is the resource allocation for the other RRH. As shown in FIG. 4, a first resource (e.g., resource blocks A2 and A3) is allocated for the CE UEs (e.g., 142 and 144), and a second resource (e.g., resource blocks A1 and A4) is allocated for the nCE UEs (e.g., 146 and 148). It is noted that the size, position, timing and other features of the first resource and the second resource are not limited, and the size, position, timing and other features of the resource for each UE (CE UE, or nCE UE) are not limited.

In this embodiment, the allocation for the CE UE 142 and the CE UE 144 is performed by the C-Sc (in the BBU). For example, the resource blocks A3 are allocated for the CE UE 142 to one RRH (as shown in 410), while the resource blocks A2 are allocated for the CE UE 144 to the other RRH (as shown in 420) in order not to interfere with each other (i.e., coordinated scheduling CoMP employed). The C-Sc preforms scheduling primarily for the CE UEs, and the information from all UEs in adjacent cells may be considered.

In this embodiment, the allocation for the nCE UE 146 and the nCE UE 148 is performed by the D-Scs (in the RRHs). For example, the rest of available resource blocks (e.g., A1 and A4) is allocated for the nCE UE (e.g., 146 for one RRH as shown in 410, and 148 for the other RRH as shown in 420). The D-Sc preforms scheduling for the nCE UEs independently on each RRH, and the requirement of each nCE UE may be considered. The D-Sc may schedule resources for the nCE UEs in an arbitrary way. In some embodiment, the D-Sc may exploit the resource blocks which are not dedicated to the CE UEs in an arbitrary way, since the interference from other neighboring cell is not significant.

Figure 5:
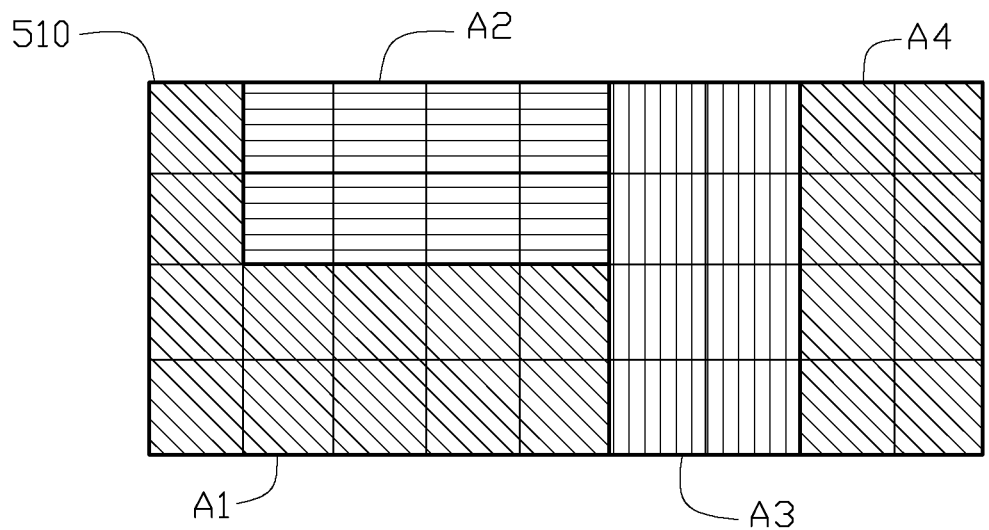
FIG. 5 is a schematic diagram illustrating resource allocation of two RRHs with joint reception/transmission CoMP employed, according to an exemplary implementation of the present application.
Figure 5:
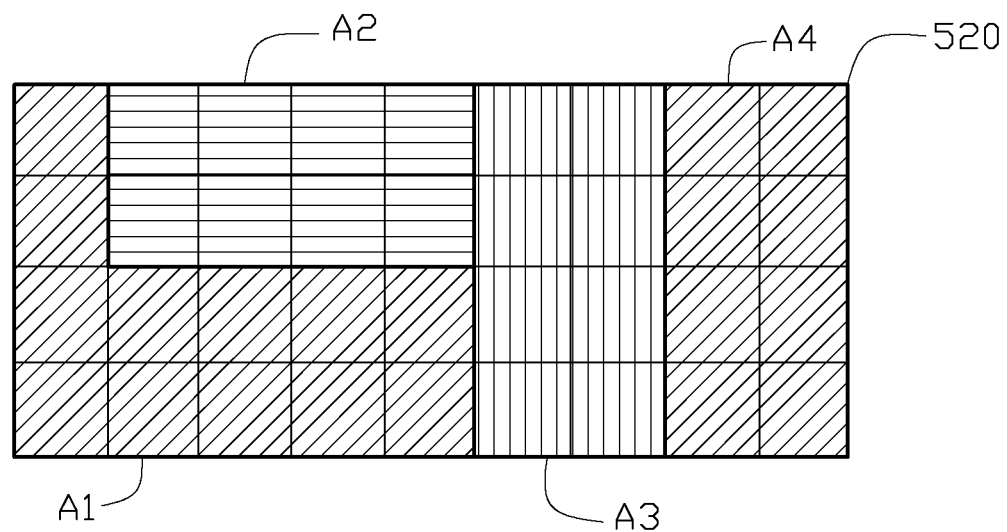

FIG. 5 is a schematic diagram illustrating resource allocation of two RRHs with joint reception/transmission CoMP employed, according to an exemplary implementation of the present application, where 510 is the resource allocation for one RRH, and 520 is the resource allocation for the other RRH. As shown in FIG. 5, joint reception/transmission CoMP is considered so the same data is sent to or received from the RRH at the same resources. For example, the resource blocks A3 are allocated for the CE UE 142 to both RRHs (both shown in 510 and 520), while the resource blocks A2 are allocated for the CE UE 144 to both RRHs (both shown in 510 and 520). It is noted that the size, position, timing and other features of the resource for each UE (CE UE, or nCE UE) are not limited.

Figure 6:
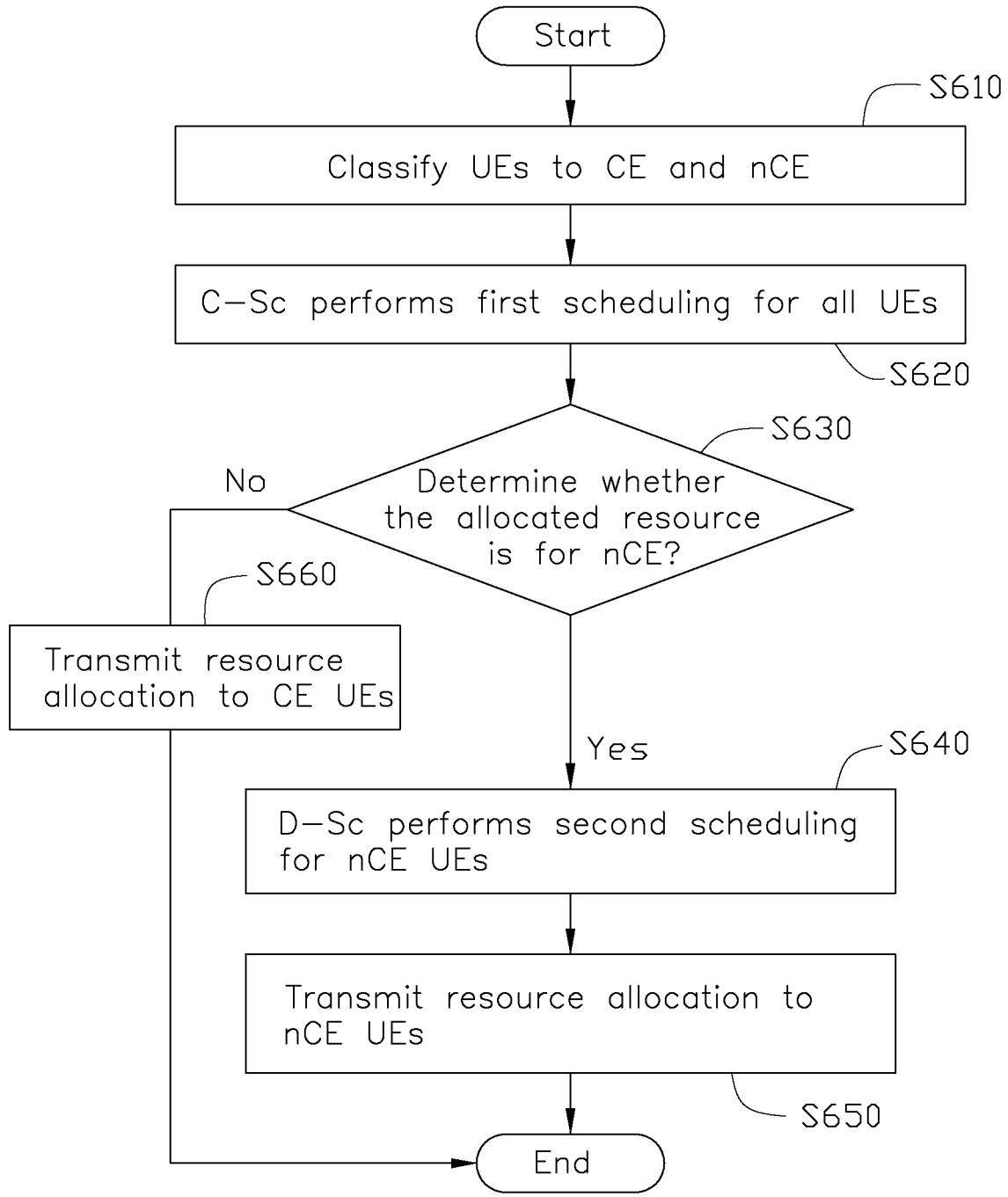
FIG. 6 is a schematic flowchart of a resource scheduling method of a wireless communication system, according to an exemplary embodiment of the present disclosure.

FIG. 6 is a flowchart of a resource scheduling method of a wireless communication system, according to an exemplary embodiment of the present disclosure. In step S610, the C-Sc classifies each of the UEs as a CE UE or an nCE UE. In one embodiment, the UE is classified according to a channel quality, e.g., signal level, reference signal received power (RSRP), reference signal received quality (RSRQ), signal to interference plus noise ratio (SINR), with a predefined threshold ($\gamma r$). For example, if the UE experiences channel quality below the predefined threshold (e.g., SINR<$\gamma r$), the UE is considered to be the CE UE. On the contrary, if the channel quality is greater than or equal to the predefined threshold (e.g., SINR≥$\gamma t$), the UE is considered to be the nCE UE. The predefined threshold ($\gamma t$) is defined to optimize the performance. If $\gamma t$ is too low, the amount of the CE UE is less, but some nCE UEs may suffer from interference. On the other hand, if $\gamma r$ is too high, a lot of UEs may be classified as the CE UEs and the amount of available resource blocks may be less since the resource blocks are shared among all the CE UEs in the CS CoMP case. The predefined threshold ($\gamma t$) is set with respect to radio channel fluctuation, for example, by a detected mobility state. The status of radio channel may be classified to at least two states: stable radio channel (e.g., a low mobility and/or a high channel coherence time) and unstable radio channel (e.g., a high mobility and/or a low channel coherence time). Additional states of the radio channel fluctuation may be defined for higher granularity of the classification and consequently for a potential improvement of the network performance.

In some embodiments, the UE is classified as the CE UE when at least two RRHs coordinate the transmission to the UE, and the UE is classified as the nCE UE when only one RRH performs the transmission to the UE. In some other embodiments, the UE is classified according to a fronthaul status of an RRH to which the UE is connected. The classification threshold is set with respect to the fronthaul status, for example, the fronthaul delay, the fronthaul load, available capacity at the fronthaul, etc. The fronthaul status may be classified to at least two states: high quality fronthaul (e.g., a low fronthaul delay and/or a high available capacity and/or a low load of the fronthaul) and low quality fronthaul (e.g., a high fronthaul delay and/or a low available capacity and/or a high fronthaul load). Additional states of the fronthaul status may be defined for higher granularity of the classification.

In one embodiment, the UE is classified according to the overall system performance. As an example, the UE is classified as the CE UE and scheduled by the C-Sc, if the UE's classification as the CE UE improves the overall system performance in terms of system capacity (e.g., due to CoMP transmission) or quality of service. In some embodiments, the UE is classified when any combination of the fronthaul status, the radio channel status and the impact on system performance is considered.

In some embodiments, the UEs are classified as the CE UE or the nCE UE by the C-Sc dynamically over time. In some embodiments, the classification of the UE may be performed periodically, and a period of the classifying step is the same as a scheduling period of the first scheduling. For instance, the classification of the UE is performed at every NxTTI.

In step S620, the C-Sc performs the first scheduling for all UEs, e.g., at every NxTTI. In the first scheduling, the C-Sc allocates the first resource for CE UEs and the second resource for nCE UEs. In one embodiment, the C-Sc further allocates the third resource for retransmission of the CE UEs. In one embodiment, the scheduling period parameter N may be adjusted dynamically over time.

In step S630, the D-Sc determines whether the allocated resource is for nCE UE. When the allocated resource is for the nCE UE, the step S640 is performed. In step S640, the D-Sc performs the second scheduling for the nCE UEs, e.g., at every TTI. In the second scheduling, the D-Sc allocates a part of the second resource for the nCE UEs so that the resource allocation from the first scheduling may be adjusted. In one embodiment, the D-Sc further allocates another part of the second resource for retransmission of the nCE UEs. In step 5650, the RRH transmits data to or receives data from the respective nCE UE on the allocated resources.

In step S630, when the allocated resource is not for nCE UE (i.e., it is for CE UE), the second scheduling is not performed by the D-Sc. Alternatively, in step S660, the RRH transmits data to or receives data from the respective CE UE on the allocated resources.

Figure 7:
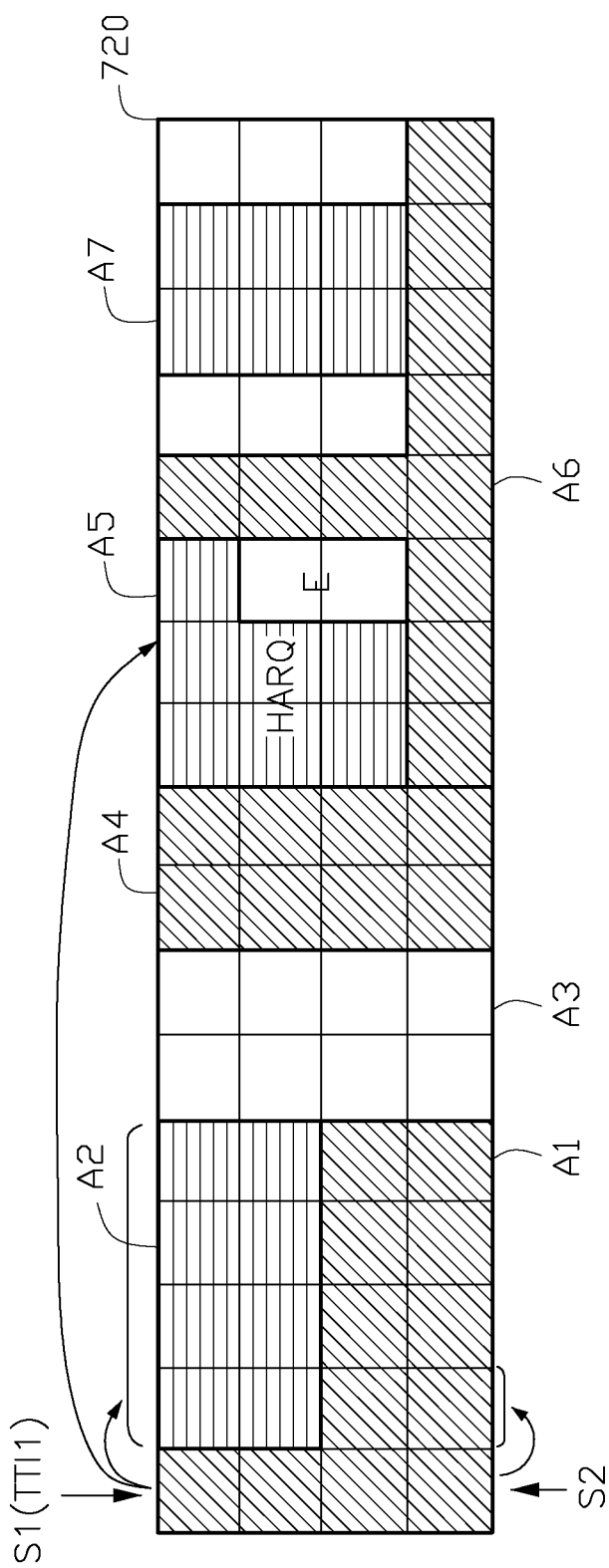
FIG. 7 is a schematic diagram illustrating resource allocation with hybrid automatic repeat request (HARQ) retransmission, according to an exemplary implementation of the present application.

FIG. 7 is a schematic diagram illustrating resource allocation with HARQ retransmission employed, according to an exemplary implementation of the present application. As shown in FIG. 7, in the scheduling S1(TTI1) performed by the C-Sc, a first resource (e.g., resource blocks A2) is allocated for the CE UE (e.g., 144), and a second resource (e.g., resource blocks A1 and A4) is allocated for the nCE UE (e.g., 148). For the CE UEs, handling HARQ retransmission by the C-Sc would lead to a high packet delay as the negative acknowledgement (NACK) would have to be delivered over fronthaul to the BBU and new scheduling decision for HARQ retransmission would have to be sent back to the RRH. Therefore, a resource is pre-allocated to the CE UEs for potential retransmissions of erroneous packets together with data scheduling decision for new data transmission(s). For example, in the scheduling S1(TTI1), the C-Sc further allocates a third resource (e.g., resource blocks A5) in advance for retransmission of the CE UE (e.g., 144). It is noted that the size, position, timing and other features of the first resource, the second resource and the third resource are not limited, and the size, position, timing and other features of the resource for each UE (CE UE, or nCE UE) are not limited.

Thus, the retransmission resources are pre-allocated to manage HARQ process without its prolongation (incl. error check, reception of NACK and block retransmission). The retransmission itself may be handled solely by the D-Sc in the pre-allocated resources with no intervention of the C-Sc to shorten whole HARQ process. This means that there is no need for further forwarding of data to be retransmitted from the BBU to the RRH.

In some embodiments, the C-Sc performs the scheduling and allocates the first resource (e.g., resource blocks A2 and A5) for the CE UE (e.g., 144). The C-Sc divides the first resource into two groups, and further allocates a first group (e.g., resource blocks A2) for the CE UE and a second group (e.g., resource blocks A5) for retransmission of the CE UE. Each part of the first group is allocated respectively for one of the CE UEs, and each part of the second group is allocated respectively for retransmission of one of the CE UEs. When the D-Sc determines that a part of the second group (e.g., resource blocks A5) for retransmission to the CE UE is not required, the D-Sc may utilize the respective part of the second group for the nCE in arbitrary way.

In some embodiments, a part of the third resource (e.g., resource blocks allocated for HARQ process) is used for retransmission to the CE UEs, while the other part of the third resource (e.g., resource blocks E) is determined by the D-Sc that it is not used for retransmission to the CE UEs, the D-Sc may utilize the other part of the third resource for nCE in an arbitrary way. In some other embodiments, when the D-Sc determines that the third resource for retransmission (e.g., resource blocks A5) is not required, the D-Sc may utilize the third resource for the nCE in an arbitrary way.

On the other hand, the D-Sc preforms the scheduling S2 for nCE UE (e.g., 148), and a first part of the second resource (e.g., a part of resource blocks A1 or A4) is allocated for the nCE UE, and a second part of the second resource (e.g., a part of resource blocks A1 or A4) is allocated for retransmission of the nCE UE when a NACK is received. In contrary, when an ACK is received (i.e., the data is delivered without error), the D-Sc can exploit the pre-allocated resources to schedule resources for the nCE UEs in an arbitrary way. In some embodiment, the D-Sc may exploit these free resource blocks for the nCE UEs since the interference from other neighboring cell is not significant.

In some embodiments, the C-Sc may perform the scheduling and allocate the second resource (e.g., resource blocks A1 and A4) for the nCE UE (e.g., 148). The C-Sc divides the second resource into two groups, and further allocates a first group (e.g., resource blocks A1) for the nCE UE and a second group (e.g., resource blocks A4) for retransmission of the nCE UE. Each part of the first group is allocated respectively for one of the nCE UEs, and each part of the second group is allocated respectively for retransmission of one of the nCE UEs. In one embodiment, the D-Sc performs the second scheduling to a part of the first group for one of the nCE UEs so that the resource allocations of the part of first group may be adjusted. In one embodiment, when the D-Sc determines that a part of the second group (e.g., resource blocks A4) for retransmission to the nCE UE is not required, the D-Sc performs the second scheduling to a part of the second group for retransmission of one of the nCE UEs so that the resource allocations of the part of second group may be adjusted. The D-Sc may utilize the resource blocks for the nCE UEs in arbitrary way. In some embodiments, the D-Sc performs the second scheduling to a part of the first group and/or a part of the second group for one of the nCE UEs so that the ratio of resource for transmission and retransmission may be adjusted.

The amount of the pre-allocated resources by the C-Sc for retransmissions is determined by the C-Sc. If only low amount of resources would be pre-allocated, the HARQ retransmission process could be prolonged since the C-Sc might need to allocate additional resources for retransmission. On the other hand, if too many resources would be pre-allocated, less amount resources or resources with lower quality can remain available for the UEs' transmission in general. Hence, it is necessary to determine proper amount resources and change it dynamically as required. In one embodiment, the amount of pre-allocated resources can be defined according to an expected error rate. The error rate may be derived from the past and actual channel quality. The error rate may also be adapted over time exploiting various techniques such as machine learning. In one embodiment, the C-Sc also determines how the retransmissions are handled (e.g., by a joint transmission of several RRHs or in a common way by only single RRH).

As described above, several resource scheduling methods are provided. According to the resource scheduling method, a first scheduling is performed by a centralized scheduler for both CE UEs and nCE UEs, and a second scheduling is performed by a distributed scheduler for the nCE UEs. When the scheduler is in BBU only, the fronthaul latency may limit the system performance. When the scheduler is in RRH only, the complexity and power consumption of the scheduler may be high. Therefore, the resource scheduling method provided in this disclosure improves the performance while the complexity and power consumption of the scheduler are low.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A resource scheduling method of a wireless communication system, comprising:
    classifying, by a centralized scheduler, each of a plurality of user equipment (UEs) as a cell-edge UE or a non cell-edge UE;
    performing, by the centralized scheduler, a first scheduling by allocating a first resource for the cell-edge UEs, a second resource for the non cell-edge UEs, and a third resource for retransmission of at least one of the cell-edge UEs; and
    performing, by a distributed scheduler, a second scheduling by allocating a first part of the second resource for at least one of the non cell-edge UEs, wherein a scheduling period of the first scheduling is determined according to a radio channel status.

2. The resource scheduling method of claim 1, wherein a method of performing the first scheduling further comprises:
    allocating, by the centralized scheduler, each part of the second resource respectively for one of the non cell-edge UEs.

3. The resource scheduling method of claim 1, wherein the second resource includes a first group and a second group, and the method of performing the first scheduling further comprises:
    allocating, by the centralized scheduler, each part of the first group respectively for one of the non cell-edge UEs, and each part of the second group respectively for retransmission of one of the non cell-edge UEs.

4. The resource scheduling method of claim 1, wherein a method of performing the second scheduling further comprises:
    allocating, by the distributed scheduler, a second part of the second resource for retransmission of at least one of the non cell-edge UEs.

5. The resource scheduling method of claim 1, wherein the method of performing the second scheduling further comprises:
    allocating, by the distributed scheduler, a part of the third resource for at least one of the non cell-edge UEs when the distributed scheduler determines that the part of the third resource for retransmission to the at least one of the cell-edge UEs is not required.

6. The resource scheduling method of claim 1, wherein each of the plurality of UEs is classified as the cell-edge UE or the non cell-edge UE according to a fronthaul status of a remote radio head (RRH) to which the UE is connected.

7. The resource scheduling method of claim 1, wherein each of the plurality of UEs is classified as the cell-edge UE or the non cell-edge UE according to an overall network performance.

8. The resource scheduling method of claim 1, wherein classification of the plurality of UEs are carried out by the centralized scheduler periodically at a time period, and the time period between each of the classifications is the same as the scheduling period of the first scheduling.

9. The resource scheduling method of claim 1, wherein the scheduling period of the first scheduling is greater than a scheduling period of the second scheduling.

10. A baseband unit (BBU), comprising:
    a centralized scheduler configured to:
    classify each of a plurality of user equipment (UEs) as a cell-edge UE or a non cell-edge UE;
    perform a first scheduling by allocating a first resource for the cell-edge UEs, a second resource for the non cell-edge UEs, and a third resource for retransmission of at least one of the cell-edge UEs, wherein a scheduling period of the first scheduling is determined according to a radio channel status.

11. The BBU of claim 10, wherein when the first scheduling is performed, the centralized scheduler is further configured to allocate each part of the second resource respectively for one of the non cell-edge UEs.

12. The BBU of claim 10, wherein the second resource includes a first group and a second group, when the first scheduling is performed, the centralized scheduler is further configured to allocate each part of the first group respectively for one of the non cell-edge UEs, and each part of the second group respectively for retransmission for one of the non cell-edge UEs.

13. The BBU of claim 10, wherein the centralized scheduler classifies the each of the plurality of UEs as the cell-edge UE or the non cell-edge UE according to a fronthaul status of a remote radio head (RRH) to which the UE is connected.

14. The BBU of claim 10, wherein the centralized scheduler classifies the each of the plurality of UEs as the cell-edge UE or the non cell-edge UE according to an overall network performance.

15. The BBU of claim 10, wherein the centralized scheduler classifies the plurality of UEs periodically, and a period of classifying the plurality of UEs is the same as the scheduling period of the first scheduling.

16. A remote radio head (RRH), comprising:
a distributed scheduler configured to:
receive an allocation of a first scheduling from a baseband unit (BBU), wherein the first scheduling is performed by a centralized scheduler of the BBU, the allocation of the first scheduling includes a first resource for cell-edge user equipment (UEs), a second resource for non cell-edge UEs, and a third resource for retransmission of at least one of the cell-edge UEs, wherein a scheduling period of the first scheduling is determined according to a radio channel status; and
perform a second scheduling by allocating a first part of the second resource for at least one of the non cell-edge UEs.

17. The RRH of claim 16, wherein each part of the second resource of the allocation of the first scheduling is respectively for one of the non cell-edge UEs.

18. The RRH of claim 16, wherein the second resource of the allocation of the first scheduling includes a first group and a second group, each part of the first group is respectively for one of the non cell-edge UEs, and each part of the second group is respectively for retransmission for one of the non cell-edge UEs.

19. The RRH of claim 16, wherein when the second scheduling is performed, the distributed scheduler is further configured to allocate a second part of the second resource for retransmission of at least one of the non cell-edge UEs.

20. The RRH of claim 16, wherein when the second scheduling is performed, the distributed scheduler is further configured to allocate a part of the third resource for at least one of the non-cell-edge UEs when the distributed scheduler determines that the part of the third resource for retransmission to the at least one of the cell-edge UEs is not required.

21. The RRH of claim 16, wherein the scheduling period of the first scheduling is greater than a scheduling period of the second scheduling.

* * * * *